(12) United States Patent
Timken et al.

(10) Patent No.: US 7,594,992 B2
(45) Date of Patent: *Sep. 29, 2009

(54) HIGHLY HOMOGENEOUS AMORPHOUS SILICA-ALUMINA CATALYST COMPOSITION

(75) Inventors: Hye Kyung C. Timken, Albany, CA (US); Mohammad M. Habib, Benicia, CA (US)

(73) Assignee: Chevron U.S.A. Inc., Sam Ramon, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 11/248,877

(22) Filed: Dec. 28, 2005

(65) Prior Publication Data

US 2006/0079398 A1   Apr. 13, 2006

Related U.S. Application Data

(62) Division of application No. 10/290,787, filed on Nov. 8, 2002, now Pat. No. 6,995,112.

(51) Int. Cl.
| | |
|---|---|
| *C10G 47/00* | (2006.01) |
| *C10G 11/00* | (2006.01) |
| *B01J 21/00* | (2006.01) |
| *B01J 23/00* | (2006.01) |
| *B01J 23/08* | (2006.01) |

(52) U.S. Cl. ............... 208/111.01; 208/120.01; 502/263; 502/355

(58) Field of Classification Search ............ 208/111.01, 208/120.01; 502/263, 355

See application file for complete search history.

(56) References Cited

U.S. PATENT DOCUMENTS

| | | | | |
|---|---|---|---|---|
| 3,726,790 | A * | 4/1973 | Gallagher et al. | ......... 208/111.3 |
| 4,025,417 | A * | 5/1977 | Pavlica | .................... 208/57 |
| 4,239,651 | A | 12/1980 | Alafandi et al. | |
| 4,289,653 | A | 9/1981 | Jaffe | |
| 4,499,197 | A | 2/1985 | Seese et al. | |
| 4,648,958 | A * | 3/1987 | Ward | ........................ 208/59 |
| 4,711,868 | A | 12/1987 | Shyr et al. | |
| 4,988,659 | A | 1/1991 | Pecoraro | |
| 5,834,522 | A | 11/1998 | Mignard et al. | |
| 5,834,572 | A | 11/1998 | Derleth et al. | |
| 5,849,852 | A | 12/1998 | Koch et al. | |

(Continued)

FOREIGN PATENT DOCUMENTS

EP    1 050 571 A1    11/2000

*Primary Examiner*—Kevin P Kerns
*Assistant Examiner*—John A Hevey
(74) *Attorney, Agent, or Firm*—Steven H. Roth

(57) ABSTRACT

Silica-alumina catalyst compositions and to a process for converting hydrocarbonaceous feed using the catalyst are disclosed. The present invention relates to a highly homogeneous, amorphous silica-alumina cogel material, the attributes of which make it especially useful for the Hydroprocessing of hydrocarbonaceous feeds either alone or in combination with other catalysts. This invention relates to a highly homogeneous amorphous silica-alumina catalyst having a surface to bulk silica to alumina ratio (SB ratio) of from about 0.7 to about 1.3, preferably from about 0.8 to about 1.2, more preferably from about 0.9 to about 1.1, and most preferably 1.0 and a crystalline alumina phase present in an amount no more than about 10%, preferably no more than about 5%. A catalyst of the present invention exhibits higher activity and better product selectivity in comparison with other silica-alumina catalysts.

7 Claims, 2 Drawing Sheets

U.S. PATENT DOCUMENTS

| | | |
|---|---|---|
| 5,925,589 A | 7/1999 | Koch et al. |
| 6,069,226 A | 5/2000 | Muller |
| 6,190,538 B1 | 2/2001 | Gosselink et al. |
| 6,399,530 B1 | 6/2002 | Chen et al. |
| 6,420,620 B1 | 7/2002 | De Bie et al. |
| 6,872,685 B2 | 3/2005 | Timken |
| 6,902,664 B2 * | 6/2005 | Timken ................ 208/111.01 |
| 2003/0038059 A1 | 2/2003 | Zanibelli et al. |
| 2004/0092385 A1 | 5/2004 | Timken |
| 2004/0092390 A1 | 5/2004 | Timken |
| 2007/0278134 A1 * | 12/2007 | Timken et al. ................ 208/58 |

* cited by examiner

Powder X-Ray Diffraction of Silica-Alumina

HIGHLY HOMOGENEOUS AMORPHOUS SILICA-ALUMINA CATALYST COMPOSITION

This application is a Divisional of application Ser. No. 10/290,787, filed Nov. 8. 2002.

FIELD OF THE INVENTION

This invention relates to improved silica-alumina catalyst compositions and to a process for converting hydrocarbonaceous feed using the catalysts. More specifically, this invention relates to a highly homogeneous, amorphous silica-alumina cogel material, the attributes of which make it especially useful for the hydroprocessing of hydrocarbonaceous feeds either alone or in combination with other catalysts.

BACKGROUND OF THE INVENTION

Silica-alumina compounds are well known as catalysts used in hydrocarbon conversion processes. Silica/alumina catalysts such as in the present invention can be used "as is", particularly in reactions that require acidic catalysts, or can optionally be combined with zeolites, clays or other binders, and inorganic oxides for the cracking of liquid hydrocarbons in cracking reactors such as fluid catalytic crackers and hydrocrackers. Silica-alumina composites have been used commercially for a variety of hydrocarbon processing applications, such as cracking, desulphurization, demetalation, and denitrification.

Amorphous silica-alumina has been prepared previously by a modified cogel process wherein no hydrogenation metals were added during the gellation step. Spray dried, amorphous silica-alumina catalysts were made by the method as described in U.S. Pat. No. 4,988,659, Pecoraro to produce catalysts used in hydrocarbon conversion processes.

The method of preparation of silica-alumina catalysts affects the chemical and physical properties of the catalysts such as activity (such as cracking or isomerization activity), and physical properties (such as pore structure and volume, surface area, density and catalyst strength). Silica-alumina catalysts such as in the present invention can be used "as is", particularly in reactions that require acidic catalysts, or can optionally be combined with zeolites, clays or other binders, and inorganic oxides for the cracking of liquid hydrocarbons in cracking reactors such as fluid catalytic crackers.

Numerous silica-alumina catalyst compositions and processes for their preparation are described in the patent literature. The patent literature teaches a number of ways to prepare these compositions. U.S. Pat. No. 4,499,197, Seese et al., for example, describes the preparation of inorganic oxide hydrogels, and more particularly, catalytically active amorphous silica-alumina and silica-alumina rare earth cogels. The active cogels are prepared by reacting aluminate and silicate solutions to obtain a silica-alumina pregel, and then reacting the pregel with an acidic rare earth and an aluminum salt solution with complete mixing. U.S. Pat. No. 4,239,651, Alfandi et al., discloses a process for preparing exchanged ammoniated cogels.

U.S. Pat. No. 4,289,653, Jaffe teaches preparing an extruded catalyst by mixing aluminum sulfate and sulfuric acid with sodium silicate to form a silica sol in an alumina salt solution at pH of 1-3, adding $NH_4OH$ under substantially constant pH of at least 4 to 6; adding more $NH_4OH$ to form a cogelled mass to pH 7.5-8.5; washing cogelled mass; mulling the mass with peptizing agent, a Group VI-B metal compound and a Group VIII metal compound to form extrudable dough; extruding; and drying and calcining.

U.S. Pat. No. 4,988,659, Pecoraro teaches a cogelled, silica-alumina matrix prepared by the method which comprises mixing a silicate solution with an aqueous solution of an acid aluminum salt and an acid, to form an acidified silica sol in said aluminum salt solution, and adjusting said silica sol/aluminum salt solution mixture to a pH in the range of about 1 to 4; slowly adding sufficient base with vigorous stirring, to said acidified silica sol/aluminum salt solution mixture to form a cogel slurry of silica and alumina, and to adjust said slurry to a pH in the range of about 5 to 9; aging said cogel slurry at a temperature of ambient to 203° F.; adjusting the pH of said cogel slurry to about 5-9; recovering a cogelled mass from said slurry; washing said cogelled mass; adjusting the pH of said cogelled mass to between about 4 and 7, and controlling conditions to induce syneresis; and forming said combination into particles.

SUMMARY OF THE INVENTION

This invention relates to a highly homogeneous amorphous silica-alumina catalyst having a surface to bulk silica to alumina ratio (SB ratio) of from about 0.7 to about 1.3, preferably from about 0.8 to about 1.2, more preferably from about 0.9 to about 1.1, and most preferably 1.0 and a crystalline alumina phase present in an amount no more than about 10%, preferably no more than about 5%. A catalyst of the present invention exhibits higher activity and higher liquid product selectivity in comparison with other silica-alumina catalysts.

The present invention also includes hydrocarbon conversion processing with catalysts comprising the present highly homogeneous, amorphous silica-alumina compositions. Examples of such hydrocarbon conversion processes are well known in the art and include, but are not limited to, single stage hydrocracking, two-stage hydrocracking, series-flow hydrocracking, mild hydrocracking, lube hydrocracking, hydrotreating, lube hydrofinishing, olefin polymerization, hydrodesulphurization, hydrodenitrification, catalytic dewaxing and catalytic cracking.

A NiW catalyst prepared with one of the silica-alumina compositions of this invention exhibited superior activity and distillate selectivity relative to a comparable catalyst with conventional silica-alumina in a hydrocracking application. The catalyst of this invention also exhibits lower gas and naphtha makes, and higher total distillate yield compared to reference silica-alumina catalysts.

DETAILED DESCRIPTION

Figure 1:
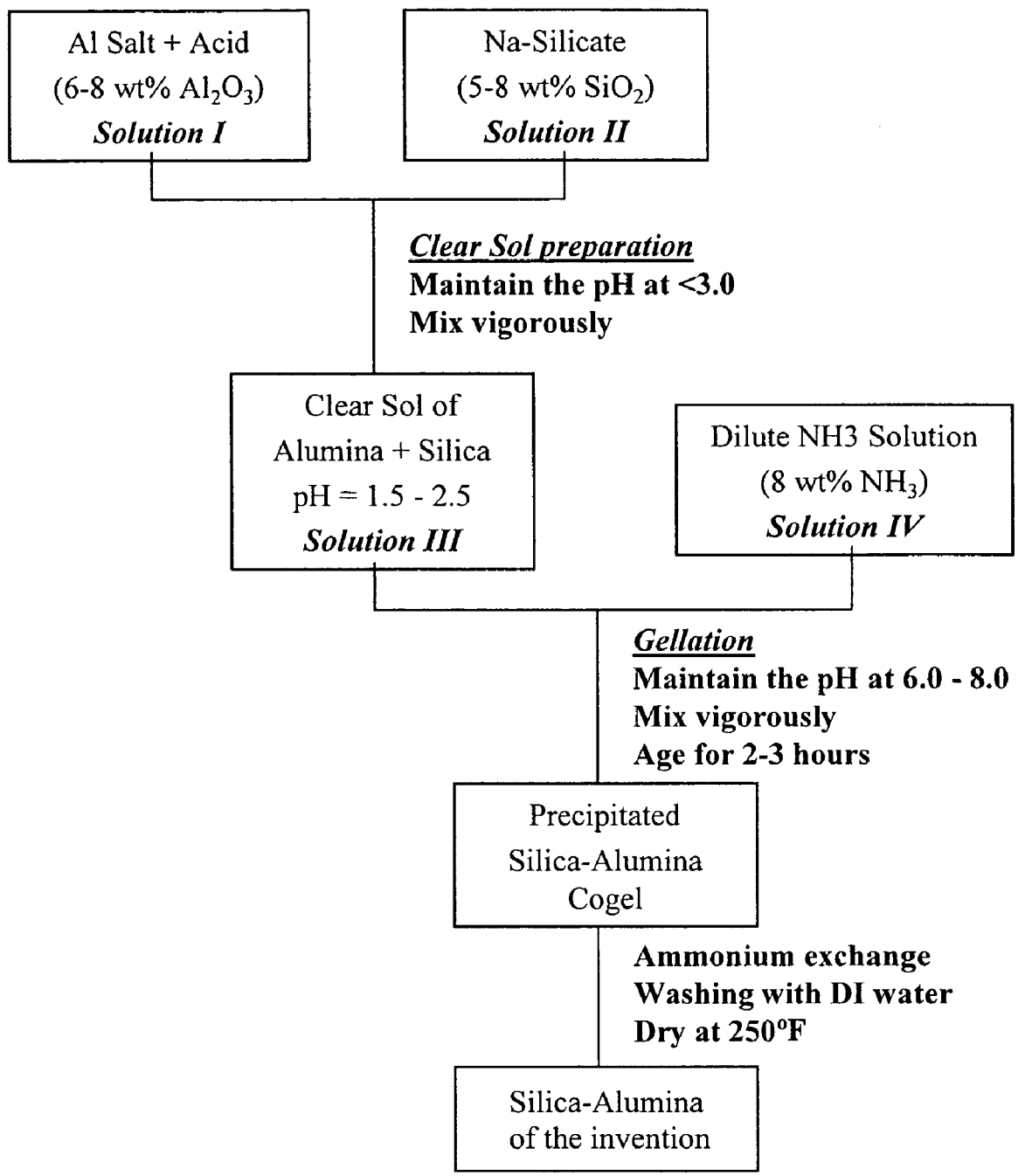
FIG. 1 is a flow diagram of an example of a general procedure for preparing a silica-alumina composition of the invention.

The silica-alumina composition of the present invention is highly homogeneous. A "Surface to Bulk Si/Al Ratio" (SB Ratio) has been selected as the measure used to define the homogeneity characteristic of the silica-alumina of the present invention and to compare it with other silica-alumina compositions.

$$SB \text{ Ratio} = \frac{(Si/Al \text{ atomic ratio of the surface measured by } XPS)}{(Si/Al \text{ atomic ratio of the bulk measured by elemental analysis})}$$

To determine the SB ratio, the Si/Al atomic ratio of the silica-alumina surface is measured using x-ray photoelectron spectroscopy (XPS). XPS is also known as electron spectroscopy for chemical analysis (ESCA). Since the penetration depth of XPS is less than 50 Å, the Si/Al atomic ratio measured by XPS is for the surface chemical composition. Use of XPS for silica-alumina characterization was published by W. Daneiell et al. in Applied Catalysis A, 196, 2000, pp 247-260. The XPS technique is, therefore, effective in measuring the chemical composition of the outer layer of catalytic particle surface. Other surface measurement techniques, such as Auger electron spectroscopy (AES) and Secondary ion mass spectroscopy (SIMS), could also be used for measurement of the surface composition.

Separately, the bulk Si/Al ratio of the composition is determined from ICP elemental analysis. Then, by comparing the surface Si/Al ratio to the bulk Si/Al ratio, the SB ratio and the homogeneity of silica-alumina are determined. How the SB ratio defines the homogeneity of a particle is explained as follows. An SB ratio of 1.0 means the material is completely homogeneous throughout the particles. An SB ratio of less than 1.0 means the particle surface is enriched with aluminum (or depleted with silicon), and aluminum is predominantly located on the external surface of the particles. The SB ratio of more than 1.0 means the particle surface is enriched with silicon (or depleted with aluminum), and aluminum is predominantly located on the internal area of the particles.

A silica-alumina composition is highly homogeneous and is a composition of the present invention when its Surface to Bulk ratio (SB ratio), i.e., the ratio of the Si/Al atomic ratio of the composition measured by XPS at the surface and the Si/Al atomic ratio of the bulk measured by elemental analysis is from about 0.7 to about 1.3, preferably from about 0.8 to about 1.2, more preferably from about 0.9 to about 1.1, and most preferably 1.0.

The SB ratio of reference silica-alumina samples from two commercial sources (Siral-40 from SasolCondea and MS-25 from W. R. Grace) was measured and the following values were obtained:

SB ratio of Siral-40 silica-alumina=2.1-2.8

SB ratio of MS-25 silica-alumina=0.2-0.6

The above results indicate that Siral type of silica-alumina is enriched with silicon on the surface of the particles (i.e., depleted with Al) as published earlier by W. Daneiell et al. in Applied Catalysis A, 196, 2000, pp 247-260. On the other hand, MS-25 silica-alumina is enriched with aluminum on the surface of the particles. The silica-alumina in accordance with the present invention has an SB ratio of from about 0.7 to about 1.3 and is highly homogeneous in that the aluminum is distributed essentially uniformly throughout the particles. To maximize the activity of the silica-alumina, it is most preferable to have a highly homogeneous silica-alumina having an SB ratio of about 1.0.

In addition to being highly homogeneous, the silica-alumina compositions of the present invention are amorphous, wherein a crystalline alumina phase, such as pseudoboehmite alumina phase, is present in an amount no greater than about 10%, preferably no greater than about 5%.

If the aluminum atoms are distributed uniformly throughout the particles, then no separate phase of alumina would be present in the sample. Based on the above hypothesis, the amount of crystalline alumina phase present in silica-alumina samples was measured using an external reference of a pseudoboehmite sample (relative peak area measurement similar to ASTM method D3906) and the results are reported in Table 1. The percent alumina phase was determined by comparing the absolute intensity of an alumina peak at 14 or 38 degree 2θ.

Figure 2:
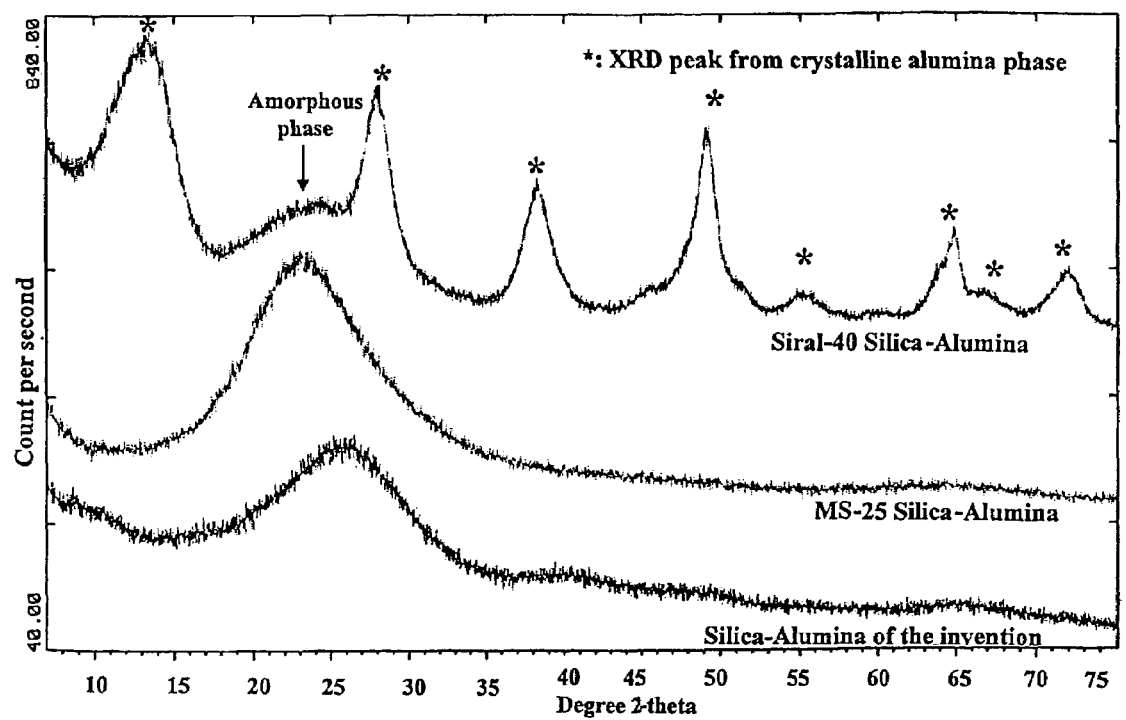
FIG. 2 is a Powder X-Ray Diffraction of various silica-alumina compositions.

Powder X-ray diffraction (XRD) spectrum of silica-alumina of the invention is compared with that of Siral-40 silica-alumina obtained from SasolCondea and shown in FIG. 2. Siral-40 silica-alumina shows a significant amount of crystalline alumina phase. Quantitation of the 14 and 38 degree 2θ peaks indicated that Siral-40 contains approximately 48 wt % of crystalline alumina phase. MS-25 silica-alumina does not exhibit crystalline alumina phase in the powder X-ray diffraction. It is not highly homogeneous, however. One possible reason that the MS-25 silica-alumina does not exhibit crystalline alumina phase in the powder X-ray diffraction is that the low loading of aluminum in the MS-25 silica-alumina (2.7 Si/Al atomic ratio) allowed the aluminum to distribute uniformly on the surface. In addition to being highly amorphous, silica-alumina according to the invention does not exhibit distinct crystalline alumina peaks. An integration of the powder X-ray diffraction spectrum in the area of 14 degree 2θ region corresponds to 0% of crystalline phase alumina. This powder X-ray spectrum along with compositional information indicates that the silica-alumina of the present invention is homogeneous throughout the particles and amorphous.

Benefits of using a silica-alumina composition of the invention in hydrocarbon conversion processing are shown by a model compound testing where the catalytic activity was measured using a model feed containing 50 wt % n-Hexane and 50 wt % 3-Methylpentane. The model compound testing was performed at 900° F. The hydrocarbon feed vaporized in helium carrier gas was flown over the 24/40 US mesh pelleted silica-alumina at 0.68 WHSV per g of catalytic material and conversions of the hydrocarbon species were measured using Gas Chromatography. As shown in Table 1, when compared to other reference silica-alumina, the silica-alumina of the present invention showed significantly higher conversion activity. Siral-40 silica-alumina shows 3.9% total conversion, MS-25 silica-alumina 5.1% total conversion while the silica-alumina of the invention shows 8.2% total conversion, which corresponds to 60-110% increase in activity.

Quantitation of the acid site using temperature programmed desorption of a base such as $NH_3$ or isopropylamine cannot differentiate desirable silica-alumina composition from the conventional silica-alumina samples. We performed temperature programmed amine desorption (TPAD) of isopropylamine (IPA) adsorbed in dehydrated silica-alumina samples per procedures published in J. Catalysis 114, 34, 1998. The results reported in Table 1 indicate that all thee silica-alumina show about 0.4 mmol/g acid site concentrations, and the desorbed IPA content does not correlate with the above model compound testing data.

The percentages of silica and alumina in the composition overall can vary widely. The composition of the silica-alumina can be changed easily to provide a wide range of aluminum content from about 10 to about 90 wt % $Al_2O_3$ in the bulk. The preferred range of aluminum content is from about 30 to about 70 wt % $Al_2O_3$ in the bulk and is most preferably about 46 wt % $Al_2O_3$ in the bulk composition which corresponds to a 1.0 Si/Al atomic ratio in the gel composition so as to maximize the activity of the final silica-alumina catalyst.

Silica-alumina according to the present invention may be prepared by a variety of methods employing batch and continuous processes in different combinations.

The two most important steps in the preparation of a silica-alumina cogel are (1) preparation of the clear sol containing silica and alumina and (2) gellation of the sol using a base solution. See U.S. Pat. No. 4,289,653, Jaffe and U.S. Pat. No. 4,988,659, Pecoraro, both of which are incorporated by reference herein. See also commonly assigned U.S. Patent Application titled "Method for Preparing A Highly Homogenous Amorphous Silica-Alumina Composition", filed concurrently herewith (now U.S. Pat. No. 6,872,685) and incorporated by reference herein.

The starting materials for the sol preparation step include aluminum salt, acid, and a silica source. The aluminum salt source that can be used for the synthesis includes aluminum sulfate, aluminum nitrate, aluminum chloride, aluminum bromide, aluminum iodide, aluminum acetate, and aluminum metal or alumina dissolved in acid. Feasible acid sources include acetic acid, formic acid, sulfuric acid, hydrochloric acid, and nitric acid. The silicate sources include, but are not limited to, sodium silicate, precipitated silica dissolved in a base, and colloidal silica.

The sol preparation can be done either via a batch process or a continuous process. It is critical to maintain the pH less than 3.0, preferably less than 2.5, and to ensure vigorous and complete mixing of the aluminum salt and silicate solutions to minimize any unwanted gel or particle formation.

A basic precipitant such as ammonium hydroxide is then added to the acidified sol solution. The addition of the precipitant raises the pH of the sol above 3, resulting in cogelling the silica and alumina species. Dilute ammonia solution is the preferred base for the gellation. In addition to dilute ammonia, other bases such as NaOH, $NaAlO_2$, KOH or organic amine derivatives can also be used for the gellation. It is preferable to use an inorganic base for its lower cost.

The gellation step can be done either via batch process or continuous process. The desirable final gellation pH is in the range of 5-9, preferably 6-8. It is critical to have complete, vigorous mixing of the Si—Al solution with the basic precipitant, and to maintain uniform pH throughout the mixture during the precipitant addition step in order to minimize formation of isolated silica domains and alumina domains.

The precipitated cogel needs to be washed to remove any unreacted silicate and aluminum salt, and then it is ammonium exchanged to remove sodium. The cogel should be aged for approximately 2-5 hours at room temperature or at an elevated temperature of up to about 90° C. and the aged cogel may be spray-dried for convenience in handling and storage, or may be further processed to the final catalyst from the moist state. If the extrudate composition is in the dry form, such as spray-dried powders, sufficient water should be added to produce a moisture content of approximately 60% by weight. After mulling for approximately 1 hour, optionally in the presence of peptizing acid or base, the material will attain a plastic or doughy state which is suitable for extrusion in commercial extrusion apparatus.

If desired, the material may be extruded, dried and calcined to produce a silica-alumina catalyst or catalyst support. The preferred method of drying and calcining includes an initial drying step in an air-purged oven at 65-175° C. and a final calcination at 480-650° F. for 0.5-5 hours in a furnace or kiln. These and other methods of finishing the material are set forth in U.S. Pat. No. 4,289,653, Jaffe, incorporated by reference herein.

Other components can be combined with the cogel, for example zeolites (large, intermediate, and/or small pore), other sieves such as Beta, SAPO's, AlPO's etc., clays, modified clays, inorganic oxides, and oxide precursors, metals, carbon, organic substances, etc. In addition, other metals may be used to exchange residual $Na_2O$. In these compositions the cogels have been found to be excellent matrices for FCC applications, as well as excellent supports for hydroprocessing applications.

The present invention also includes hydrocarbon conversion processing with catalysts comprising the present highly homogeneous, amorphous silica-alumina compositions. Examples of such hydrocarbon conversion processes in which the subject silica-alumina catalysts may be used are well known in the art and include, but are not limited to, single stage hydrocracking, two-stage hydrocracking, series-flow hydrocracking, mild hydrocracking, lube hydrocracking, hydrotreating, lube hydrofinishing, olefin polymerization, hydrodesulphurization, hydrodenitrification, catalytic dewaxing and catalytic cracking.

The present invention also provides a process for converting hydrocarbons comprising contacting a hydrocarbonaceous feed at hydrocarbon converting conditions with a catalyst comprising highly homogeneous amorphous silica-alumina catalyst having a Surface to Bulk Si/Al ratio of from about 0.7 to about 1.3, preferably from about 0.8 to about 1.2, more preferably from about 0.9 to about 1.1, and most preferably 1.0 and a crystalline alumina phase present in an amount no more than about 10%, preferably no more than about 5%.

The present invention also provides a hydrocracking process comprising contacting the catalyst of the invention with a hydrocarbon feedstock under hydrocracking conditions.

The present invention also provides a catalytic dewaxing process comprising contacting the catalyst of the invention with a hydrocarbon feedstock under dewaxing conditions.

The present invention also provides a process for catalytically dewaxing a hydrocarbon oil feedstock boiling above about 650° F. and containing straight chain and slightly branched chain hydrocarbons comprising contacting said hydrocarbon oil feedstock in the presence of added hydrogen gas at a hydrogen pressure of about 500-3000 psig under dewaxing conditions with the catalyst of the invention.

The present invention also provides a process for lube oil hydrofinishing comprising contacting the catalyst of the invention with a hydrocarbon oil feedstock boiling above about 650° F. under hydrogenation conditions in to produce a lubricating oil base stock.

The present invention also provides a catalytic cracking process comprising contacting a hydrocarbon feedstock in a reaction zone under catalytic cracking conditions in the absence of added hydrogen with the catalyst of the invention.

The process conditions and other catalyst components useful with the silica-alumina catalysts of the present invention are well known in the art. Representative examples are disclosed U.S. Pat. Nos. 4,910,006, 4,921,594, 5,316,753, 5,393,410, 5,834,572, 5,993,644 and 6,264,826 which are incorporated by reference herein in their entirety.

Feedstocks which can be suitably employed in the process according to the present invention comprise gas oils, vacuum gas oils, deasphalted oils, long residues, catalytically cracked cycle oils, coker gas oils and other thermally cracked gas oils and syncrudes, optionally origination from tar sands, shale oils, waxy hydrocarbons from Fisher-Tropsch hydrocarbon synthesis process, residue upgrading processes or biomass. Combinations of various feedstocks can also be employed.

The following Examples are illustrative of the present invention, but are not intended to limit the invention in any way beyond what is contained in the claims which follow.

EXAMPLE 1

Synthesis of Silica-Alumina of the Invention by Batch Gellation

An acidic aluminum solution (Solution I containing 7.3 wt % $Al_2O_3$) was prepared by dissolving 1089 g of $AlCl_3 \cdot 6H_2O$ and 205 g of acetic acid (99.9% concentrated) in 1857 g of deionized water. A dilute solution of sodium silicate (Solution II containing 5 wt % $SiO_2$) was prepared by diluting 931 g of concentrated sodium silicate solution (contains 29 wt % $SiO_2$ and 9% $Na_2O$) with deionized water. The silicate solution was gradually added to the aluminum solution while vigorously mixing to prepare Solution III. It is desirable to maintain the pH below 3.0 to ensure formation of clear sol of silica and alumina. The final pH of the Solution III was 2.2, and the mixing produced a clear silica and alumina solution. The final Solution III contained:

$SiO_2/Al_2O_3$ molar ratio of 2.0

$H^+/Na^+$ molar ratio of 1.1

Diluted ammonia solution (Solution IV containing 8 wt % $NH_3$) was prepared for gellation. The diluted ammonia solution was added gradually to Solution III containing silica and alumina sol while vigorously mixing. Cogelled silica-alumina started to precipitate when the pH of the slurry reached at about 3.2, and then gellation completed when the pH reached at about 7. We continued the ammonia solution addition until the pH of the slurry reached 8.0. The gel slurry was aged at room temperature for 3 hours while stirring. This cogelled silica-alumina was filtered to produce a filtered cake. The cake was washed with a hot solution of ammonium acetate (3.8 wt %, 10 L solution, 125° F.) for 15 minutes, and then rinsed with 10 L of deionized water. The washing step was repeated four more times. The final cake was dried at 250° F. overnight. A small amount of the dried silica-alumina cake was crushed to small pieces and calcined under excess dry air at 1000° F. for 1 hour for activation. Physical properties of the final silica-alumina are summarized in Table 1.

TABLE 1

Physical Properties and Conversion Activity of Silica-Alumina Compositions

|  | Silica-Alumina Invention (Example 1) | Reference, Siral-40 Silica-Alumina | Reference, MS-25 Silica-Alumina |
|---|---|---|---|
| Surface area, $m^2/g$ (a) | 362 | 513 | 486 |
| Total pore volume, cc/g (b) | 0.51 | 0.83 | 0.80 |
| Pore size distribution by $N_2$ Adsorption (b) | | | |
| 30 Å−, % | 8.6 | 7.9 | 5.9 |
| 30-60 Å, % | 55.5 | 30.5 | 45.0 |
| 60-100 Å, % | 32.9 | 32.8 | 39.9 |
| 100-200 Å, % | 1.4 | 18.6 | 8.3 |
| 200-300 Å+, % | 0.4 | 4.2 | 0.4 |
| 300 Å+, % | 1.2 | 5.9 | 0.5 |
| Mean Pore Diameter, Å | 69 | 113 | 75 |
| Na, wt % | <0.05 | <0.05 | <0.05 |
| Surface Si/Al atomic ratio, by XPS | 0.98 | 1.17 | 1.31 |
| Bulk Si/Al atomic ratio, by elemental anal. | 1.03 | 0.57 | 2.74 |
| Surface to Bulk Si/Al Ratio | 0.95 | 2.05 | 0.48 |
| % crystalline alumina phase, by XRD | 0% | 48% | 0% |
| $nC_6 + iC_6$ Model Compound Testing (b) | | | |
| Total conversion, wt % | 8.2 | 3.9 | 5.1 |
| $nC_6$ conversion, wt % | 1.0 | 0.8 | 0.9 |
| $iC_6$ conversion, wt % | 15.4 | 7.1 | 9.4 |
| Isopropylamine TPAD, mmol/g | 0.43 | 0.35 | 0.49 |

(a): BET measurements after activation at 1000° F. for 1 hr.
(b): determined after activation at 1000° F. for 1 hr.

EXAMPLE 2

Synthesis of Silica-Alumina of the Invention by Continuous Gellation

An acidic aluminum solution (Solution I containing 6 wt % $Al_2O_3$) was prepared by dissolving 3127 g of $Al_2(SO_4)_3 \cdot 16H_2O$ and 338 g of sulfuric acid (98% concentrated) in 4968 g of deionized water. A dilute solution of sodium silicate (Solution II containing 6 wt % $SiO_2$) was prepared by diluting 2070 g of concentrated sodium silicate solution (contains 29 wt % $SiO_2$ and 9% $Na_2O$) with deionized water. The silicate solution was gradually added to the aluminum solution while vigorously mixing to prepare Solution III. The final pH of the Solution III was 2.1, and the mixing produced a clear silica and alumina solution. The final Solution III contained:

$SiO_2/Al_2O_3$ molar ratio of 2.0

$H^+/Na^+$ molar ratio of 1.2

Diluted ammonia solution (containing 8 wt % $NH_3$) was prepared for gellation. The dilute ammonia solution and the Solution III containing the silica and alumina sol were pumped separately and simultaneously into the mixing chamber of an in-line blender. Mixing in the in-line blender was vigorous with 1600-RPM blender-blade rotation. The volume of the mixing chamber is smaller than the total volume of solutions pumped in 1 minute (i.e., less than 1 minute residence time per volume). The addition rate of the ammonia solution was adjusted to maintain the pH of the gel product at 7±0.5. The gel slurry was collected and then aged at room temperature for 2 hours while stirring. This cogelled silica-alumina was filtered to produce a filtered cake. The cake was washed with a hot solution of ammonium sulfate (5 wt %, 10 L solution) for 15 minutes, and then rinsed with 10 L of deionized water. The washing step was repeated four more times. The final cake was dried at 250° F. overnight. A small amount of the silica-alumina was crushed to small pieces and calcined under excess dry air at 1000° F. for 1 hour for activation. Physical properties of the final silica-alumina are summarized in Table 2.

EXAMPLE 3

Synthesis of Silica-Alumina of the Invention by Continuous Sol Preparation Followed by Continuous Gel Preparation This silica-alumina was identical in composition to that prepared in Example 2, but the preparation procedure was different. In this example, the in-line blender from Example 2 was used to prepare Solution III, a clear solution containing silica and alumina sol, as well as for the final continuous gellation. The alumina/sulfuric acid solution (Solution I) and the silicate solution (Solution II) were pumped separately and simultaneously into the mixing chamber of an in-line blender while vigorously mixing. Mixing in the in-line blender was vigorous with 1600-RPM blender-blade rotation. The pH of the combined solution ranged 1.9-2.0. Then the product from the in-line blender (Solution III containing the silica and alumina sol) and the dilute ammonia solution were pumped separately and simultaneously into the mixing chamber of a second in-line blender for gel formation. The rate of the ammonia solution was adjusted to maintain the pH of the gel product at 7±0.5. The mixing in the in-line blender was again vigorous with 1600-RPM blender-blade rotation. The gel product was collected and then aged at room temperature for 2 hours while stirring. This cogelled silica-alumina was filtered to produce a filtered cake. The cake was washed with a hot solution of ammonium sulfate (5 wt %, 10 L solution) for 15 minutes, and then rinsed with 10 L of deionized water. The washing step was repeated four more times. The final cake was dried at 250° F. overnight. A small amount of the silica-alumina was sized to small pieces and calcined under excess dry air at 1000° F. for 1 hour for activation. Physical properties of the final silica-alumina are summarized in Table 2.

TABLE 2

Physical Properties and Conversion Activity of a Silica-Alumina of the Invention Prepared by a Continuous Process

| | Silica-Alumina Invention (Example 2) | Silica-Alumina Invention (Example 3) |
|---|---|---|
| Surface area, $m^2/g$ (a) | 418 | 367 |
| Total pore volume, cc/g (b) | 0.55 | 0.77 |
| Pore size distribution by $N_2$ Adsorption (b) | | |
| 30 Å–, % | 11.4 | 8.2 |
| 30-60 Å, % | 54.7 | 22.9 |
| 60-100 Å, % | 25.2 | 17.2 |
| 100-200 Å, % | 6.3 | 23.3 |
| 200-300 Å+, % | 1.0 | 11.1 |
| 300 Å+, % | 1.4 | 17.3 |
| Mean Pore Diameter, Å | 71 | 187 |
| Na, wt % | <0.05 | <0.05 |
| Surface Si/Al atomic ratio, by XPS | 1.07 | 1.21 |
| Bulk Si/Al atomic ratio, by elemental anal. | 1.03 | 0.96 |
| Surface to Bulk Si/Al Ratio | 1.04 | 1.26 |
| % crystalline alumina phase, by XRD | 0% | 5% |
| $nC_6 + iC_6$ Model Compound Testing | | |
| Total conversion, wt % | 11.3 | 8.6 |
| $nC_6$ conversion, wt % | 1.3 | 1.2 |
| $iC_6$ conversion, wt % | 21.3 | 16 |

The continuous preparations of Example 2 and Example 3 produced high quality silica-alumina with uniform composition. They exhibited high surface areas of 418 and 367 $m^2/g$. The continuous gellation prep (Example 2) produced a composition with the pore size distribution nearly identical to the sample produced via batch gellation (Example 1). The continuous sol/continuous gel preparation produced a silica-alumina of the invention with much larger pores (Example 3). The mean pore diameter is 187 Å for silica-alumina made by the continuous sol/ continuous gel preparation, and 69 and 71 Å for silica-alumina prepared by the batch gellation and continuous gellation, respectively. All silica-alumina samples showed excellent activity for hydrocarbon conversion as shown with the model compound testing. Example 2 showed 11.3% total hydrocarbon conversion and Example 3 8.6% conversion, comparable to the sample prepared via batch gellation.

EXAMPLE 4

(Comparative) Preparation of NiW Hydrocracking Catalyst with Silica-Alumina (Catalyst A—base-case)

A base-case hydrocracking catalyst containing Siral-40, the reference silica-alumina from Table 1, was prepared per following procedure. 75 parts silica-alumina powder (Siral-40, obtained from SasolCondea) and 25 parts pseudoboehmite alumina powder (obtained from Vista) were mixed well. To the mix, diluted $HNO_3$ acid and sufficient amount of deionized water were added to form an extrudable paste (3 wt % $HNO_3$ to the total powders). These weights are on 100% solids basis. The paste was extruded in $\frac{1}{16}$" cylinder, and dried at 250° F. overnight. The dried extrudates were calcined at 1100° F. for 1 hour with purging excess dry air, and cooled down to room temperature.

Impregnation of Ni and W was done using a solution containing ammonium metatungstate and nickel nitrate to the target metal loadings of 4 wt % NiO and 28 wt % $WO_3$ in the finished catalyst. The total volume of the solution matched the 100% water pore volume of the base extrudate sample (incipient wetness method). The metal solution was added to the base extrudates gradually while tumbling the extrudates. When the solution addition was complete, the soaked extrudates were aged for 2 hours. Then the extrudates were dried at 250° F. overnight. The dried extrudates were calcined at 935° F. for 1 hour with purging excess dry air, and cooled down to room temperature. This catalyst is named Catalyst A and its physical properties are summarized in Table 4.

Catalyst B, a NiW catalyst containing silica-alumina of the invention, was prepared using a procedure similar to Catalyst A. For Catalyst B, 80 parts silica-alumina of the invention from Example 1 and 20 parts pseudoboehmite alumina were used to prepare the base extrudates. The target metal loadings were 4 wt % Ni and 20 wt % W.

Catalyst C, a silica-alumina containing silica-alumina of the invention was prepared using a procedure nearly identical to Catalyst A. For Catalyst C, silica-alumina of the invention from Example 3 was used to prepare the base extrudates. Physical properties of Catalyst B and C are summarized in Table 4.

A petroleum feedstock with the following properties (Table 3) was used to evaluate the catalysts.

Micro unit evaluation of catalysts was done in a once-through, down-flow micro unit with 6 cc of 24/40 (US) meshed catalyst. Process conditions were approximately 2000 psig reactor pressure, a feed rate of 1.5 hour$^{-1}$ LHSV and once-though $H_2$ flow rate corresponding 5000 SCF of $H_2$/bbl of oil. The catalyst bed temperature was varied to cover 60-80 wt % of conversion of the 700° F.$^+$ feed to 700° F.$^-$ product. The yields of $C_4^-$ gas, naphtha, and light and heavy distillate components were calculated using D2887 Simdis analysis results. The overall yields and reactor temperature data were interpolated to 70 wt % conversion and summarized in Table 4.

Catalysts of the invention (Catalysts B and C) showed much higher activity than the base case catalyst made with a commercial silica-alumina (Catalyst A). A catalyst of the invention achieved the same conversion at 23-24° F. lower reactor temperatures (Table 4). In addition, liquid product selectivity is also favored by catalysts of invention in that about 1 wt % advantage in the distillate yield was observed. Such high activity advantage and at the same time better distillate selectivity are quite unexpected benefits of silica-alumina of the present invention.

TABLE 4

Catalyst Properties and Performance

|  | Catalyst A Non-Invention | Catalyst B Invention | Catalyst C Invention |
|---|---|---|---|
| Composition (before metals addition) |  |  |  |
| Silica-Alumina | 75% Siral-40 | 80% silica-alumina (Example 1) | 75% silica-alumina (Example 3) |
| $Al_2O_3$ Binder | 25% Catapal B | 20% Catapal B | 25% Catapal B |
| Properties after Metals Addition |  |  |  |
| Ni, wt % | 3.2 | 3.9 | 3.3 |
| W, wt % | 21.4 | 18.7 | 21.6 |
| Surface area, m$^2$/g | 229 | 182 | 166 |
| Catalyst Performance in Single-Pass Micro Unit |  |  |  |
| Activity, ° F., for 70% Conversion | 741 | 717 | 718 |
| Yields @ 70% Conv., wt % |  |  |  |
| $C_4^-$ Gas | 3.3 | 2.9 | 2.8 |
| Naphtha (C5 —250° F.) | 13.1 | 12.8 | 12.8 |
| Light Distillate (250° F.-550° F.) | 36.4 | 37.2 | 37.4 |
| Heavy Distillate (550° F.-700° F.) | 21.3 | 21.1 | 21.0 |
| Total Distillate (250° F.-700° F.) | 57.7 | 58.3 | 58.5 |

TABLE 3

Feedstock Properties

| Properties |  |
|---|---|
| API Gravity | 33.7 |
| Sulfur, ppm wt | 7 |
| Nitrogen, ppm wt | 0.7 |
| D2887 Simulated Distillation |  |
| IBP | 645° F. |
| 10 wt % | 707° F. |
| 30 wt % | 769° F. |
| 50 wt % | 826° F. |
| 70 wt % | 890° F. |
| 90 wt % | 977° F. |
| End Point | 1079° F. |

While not wanting to be bound by any specific theory, the performance advantage of the catalyst of the invention appears to come from maximizing the number of the available acid sites in the silica-alumina composition. This was achieved by having a highly homogeneous distribution of aluminum throughout the silica-alumina particles. As a result, the silica-alumina of the present invention exhibits much higher activity than conventional silica-alumina. Typically, higher activity is connected to poorer selectivity for distillate. Surprisingly, on the contrary catalysts of the present invention exhibit the additional benefit of improved distillate yield, indicating enhanced isomerization activity.

There are numerous variations on the present invention which are possible in light of the teachings and supporting examples described herein. It is therefore understood that within the scope of the following claims, the invention may be practiced otherwise than as specifically described or exemplified herein.

What is claimed is:

1. A process for converting hydrocarbons comprising contacting a hydrocarbonaceous feed at hydrocarbon converting conditions with a catalyst comprising a highly homogeneous amorphous silica-alumina cogel catalyst having a Surface to Bulk Si/Al ratio of from about 0.9 to about 1.1 and wherein an alumina phase is present in an amount of no greater than about 5%.

2. The process of claim 1, wherein the process is a hydrocraking process comprising contacting the catalyst with a hydrocarbon feedstock under hydrocracking conditions.

3. The process of claim 1, wherein the process is a dewaxing process comprising contacting the catalyst with a hydrocarbon feedstock under dewaxing conditions.

4. The process of claim 1, wherein the process is a process for catalytically dewaxing a hydrocarbon oil feedstock boiling above about 650° F. and containing straight chain and slightly branched chain hydrocarbons comprising contacting the catalyst with a hydrocarbon oil feedstock in the presence of added hydrogen gas at a hydrogen pressure of about 500-3000 psig under dewaxing conditions with the catalyst.

5. The process of claim 1, wherein the process is a catalytic cracking process comprising contacting the catalyst with a hydrocarbon feedstock in a reaction zone under catalytic cracking conditions in the absence of added hydrogen.

6. The process of claim 1, wherein the process is a lube oil hydrofinishing process comprising contacting the catalyst with a hydrocarbon oil feedstock boiling above about 65° F. under hydrogenation conditions to produce a lubricating oil base stock.

7. The process of claim 1, wherein the hydrocarbon feedstock is selected from the group consisting of gas oils, vacuum gas oils, deasphalted oils, long residues, catalytically cracked cycle oils, coker gas oils, other thermally cracked gas oils, syncrudes shale oils, waxy hydrocarbons from Fischer-Tropsch hydrocarbon synthesis process, residue upgrading processes or, biomass and mixtures thereof.

* * * * *